3,396,114
Patented Aug. 6, 1968

3,396,114
COMBINATION HYDRAULIC AND
TRANSMISSION FLUIDS
Paul C. Vienna, Calumet City, Ill., and John J. Plemich, Whiting, and James W. Gaynor, Valparaiso, Ind., assignors to Standard Oil Company, Chicago, Ill., a corporation of Indiana
No Drawing. Continuation-in-part of application Ser. No. 334,543, Dec. 30, 1963. This application Nov. 3, 1966, Ser. No. 591,722
2 Claims. (Cl. 252—75)

ABSTRACT OF THE DISCLOSURE

A dual purpose lubricant for use as the sole lubricant in hydraulic and gear transmission systems, consisting essentially of (a) about 3–5 vol. percent of tricresyl phosphate; (b) about 7–12 vol. percent of an oil-soluble neutral calcium sulfonate; (c) about 0.5–2 vol. percent of a poly ($C_{4-20}$ alkyl) methacrylate viscosity index improver having a molecular weight of about 10,000–30,000; (d) about 0.5–2 vol. percent of a hindered phenol having at least one alkyl substituent ortho to a phenolic hydroxyl group; (e) about 0.5–2 vol. percent of a paraffin wax alkylated naphthalene lubricating oil pour point depressor; (f) about 0.1–0.5 vol. percent of a $C_{1-4}$ alkyl ester of a chlorinated $C_{12-18}$ fatty acid; (g) about 5–20 parts per million of a silicone polymer antifoam agent; and (h) the remainder a petroleum lubricating oil having an aniline point of about 195–210° F.; said fluid having a minimum viscosity of about 47 SSU at 210° F. and a maximum viscosity (extrapolated) at 0° F. of about 12,000 SSU, and an aniline point of about 195–210° F.

This is a continuation-in-part of application Ser. No. 334,543 filed Dec. 30, 1963, now abandoned.

This invention relates to combination hydraulic and transmission fluids, and particularly to dual performance fluids having improved tractor transmission gear lubricating qualities and stability, and hydraulic fluid properties.

Tractor transmissions require heavy duty fluids which will stand up under severe operating conditions and perform both hydraulic and gear lubricating functions. A single fluid is used both as the transmission lubricant as well as the power furnishing hydraulic fluid to control, manipulate, and lift hydraulically operated tools and equipment associated with tractors. Newer transmissions are designed for even more severe service and accordingly higher transmission operating temperatures than ever before are now being encountered. Thus, the requirements of fluids for applications of this type have grown more and more difficult to fulfill. A great variety of additives or inhibitors are known which are generally effective in other applications such as motor oil or automatic automobile transmission service. Many of these, however, cannot be employed for the present service because the requirements set up to qualify a combination hydraulic and transmission fluid are stringent and numerous. For example, a fluid which meets the requirements for viscosity, viscosity index and pour point may not have the necessary thermal and oxidation stability or may have an adverse affect on rubber elements, and vice versa. Accordingly, there has been difficulyt in formulating a combination hydraulic and transmission fluid which meets all the demands of present day heavy duty service.

It is an object of the present invention to provide a combination hydraulic and transmission fluid having improved performance in clutch systems. Another object of the invention is to provide a combination hydraulic and transmission fluid having improved water tolerance, improved rust inhibiting properties, improved load carrying (E.P.) properties, and which does not adversely affect rubber parts.

The improved combination hydraulic and transmission fluid of the present invention consists essentially of the following components in the approximate proportions:

| Component | Percent By Volume | |
|---|---|---|
| | Range | Preferred |
| Tricresyl phosphate | 3.0–5.0 | 3.1 |
| Preferentially oil-soluble neutral calcium sulfonate | 7.0–12.0 | 9.0 |
| Polymethacrylate viscosity index improver | 0.5–2.0 | 1.0 |
| Hindered anti-oxidant phenol | 0.5–2.0 | 1.0 |
| Lubricating Oil pour point depressor | 0.5–2.0 | 2.0 |
| Alkyl chlorinated long chain fatty acid ester | 0.1–0.5 | 0.3 |
| Silicone polymer foam inhibitor, p.p.m. | 5–20.0 | 10 |
| Dye | 0–0.5 | 0–1 |
| Lubricating base oil | | [1] |

[1] Remainder.

The fluid is further characterized by having a minimum viscosity of about 47 SSU at 210° F. and a maximum viscosity (extrapolated) at 0° F. of about 12,000 SSU, and an aniline point of about 195–210- F.

The E.P. agent which is suitable for providing the requisite load carrying ability of the fluid without adversely affecting the other performance characteristics of the fluid is tricresyl phosphate.

The preferentially oil-soluble calcium sulfonate employed is a neutral sulfonate, having a molecular weight of about 350–500, prepared by neutralization of a sulfonic acid with a basic calcium compound. The sulfonic acids are well known to those skilled in the art; especially useable are the preferentially oil-soluble sulfonic acids and preferably the petroleum sulfonic acids. The sulfonic acids include the mahogany sulfonic acids, unsaturated paraffin wax sulfonic acids, petrolatum sulfonic acids, monoparaffin wax-substituted naphthalene sulfonic acids, diparaffin wax-substituted phenol sulfonic acids, wax sulfonic acids, petroleum naphthalene sulfonic acids, fuel oil substituted-benzene sulfonic acids (synthetic alkyl aryl sulfonic acids), diphenyl ether sulfonic acids, diphenyl ether disulfonic acids, naphthalene disulfide sulfonic acids, naphthalene disulfide disulfonic acids, diphenyl amine disulfonic acids, diphenyl amine sulfonic acids, thiophene sulfonic acids, alpha-chloronaphthalene sulfonic acids, cetyl chlorobenzene sulfonic acids, cetyl-sulfonic acids, cetyl-phenol disulfide sulfonic acids, cetyl-phenol monosulfide sulfonic acids, cetoxy capryl-benzene sulfonic acids, dicetyl thianthrene sulfonic acids, di-lauryl beta naphthol sulfide sulfonic acids, cetoxy capryl-benzene sulfoni acids, hydroxy substituted paraffin wax sulfonic acids, tetra-isobutylene sulfonic acids, tetra-amylene sulfonic acids, chloro-substituted paraffin wax sulfonic acids, nitroso paraffin wax sulfonic acids, cetyl-cyclopentyl sulfonic acids, lauryl-cyclo-hexyl sulfonic acids, mono- and polywax substituted cyclohexyl sulfonic acids, etc. Other useable preferentially oil-soluble sulfonic acids are well described in the art, for example, see U.S. 2,616,904; U.S. 2,626,207, and U.S. 2,767,209.

The preferentially oil-soluble sulfonic acids may be derived from various petroleum fractions such as gas, oil, kerosene, light oil, turbine oil, mineral lubricating oil, white oil distillates, heavy oil petroleum waxes (e.g. petrolatum paraffin wax and mixtures of various hydrocarbon wax fractions), etc. They an be obtained, for example, by treating the petroleum fraction with concentrated sulfonic acid or sulfur trioxide. The oil-soluble sulfonic acids derived in this manner are commonly called "mahogany acids."

The sulfonate is prepared from a sulfonic acid by conventional neutralization techniques well known in the art. The calcium compound, such as calcium oxide or calcium hydroxide, is added to neutralize the sulfonic acid. The oil-soluble neutral calcium sulfonate or mixtures thereof will be present in an amount ranging from about 7 to about 12 vol. percent of the total lubricating composition.

The polymethacrylate viscosity index improver is one having the general formula:

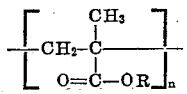

wherein R is an alkyl group or a mixture of alkyl groups containing from about 4 to about 20 carbon atoms, and $n$ is a number providing a molecular weight of the polymer of about 10,000–30,000. Various polymethacrylates of this type are known which possess pour depressant and viscosity index improving properties. A very satisfactory material of this type is a polymer of the lower $C_{4-14}$ alkyl methacrylate monomers. A commercial polymethacrylate, which is primarily a viscosity index improver, is sold under the trade name "Acryloid 710" wherein R comprises about 50 percent lauryl and 50 percent octyl groups and the molecular weight is about 10,000 to 20,000. Another commercially available polymethacrylate is "Acryloid 615" wherein the alkyl groups are a mixture of groups derived from Oxo alcohols and the polymer has a molecular weight of about 10,000–30,000. Another suitable polymethacrylate is available under the trade name "Acryloid 150," in which the alkyl group is predominantly a mixture of 50% cetyl, 25% lauryl and 25% octyl groups and which has a molecular weight of about 10,000–15,000.

The hindered phenols used as anti-oxidants in the present invention are compounds having one or more phenyl rings with a tertiary alkyl group, usually tertiary butyl, located ortho to each hydroxyl group to sterically hinder its reactivity. Hindered phenols as a class are well known; illustrative examples thereof include 4,4′-thio-bis(6-tert-butyl-m-cresol); 4,4′-thio-bis(6-tert-butyl-o-cresol); 2,6-di-(tert-butyl)-p-cresol; 4,4′-methylene bis(2,6-di-tert butyl phenol); 4,4′-bis(2,6-di-tert-butyl-phenol); 2,6 - di - tert-butyl-alpha-dimethylamino-p-cresol; 2,6-di-tert - butyl - alpha-methoxy-p-cresol; 2,6-di-tert-butyl-phenol; and mixed tert-butyl-phenols such as those containing at least 75% of 2,6-di-tert-butyl-phenol; 4,4′-methylene bis(6-tert-butyl-o-cresol); 2,2′ - methylene bis(4-methyl-6-tert-butyl-phenol; and 2,2-methylene bis(4-ethyl-6-tert-butyl phenol); etc. Most of the aforementioned materials, in addition to numerous others, are commercially available. The well-known generic class of hindered phenols is also discussed in a paper given in the Petroleum Division of American Chemical Society, April 1960, "The Synergistic Effect of Dialkyl Phosphonates on Antioxidant Action of Hindered Phenols," G. G. Krapp et al. A commercial material of this type, di-(tert-butyl)-p-cresol, is available under the trade name "Paranox 441."

The pour point depressor used is preferably a wax alkylated naphthalene which is well known as a pour point depressor for lubricating oils. These materials are in general prepared by chlorinating paraffin wax and condensing the chlorowax with naphthalene. A preferred product is that prepared by the process described in U.S. Patents 1,963,917 and 1,963,918. Wax alkylated naphthalene products are marketed under trade names such as "Pourex" and "Paraflow." Other pour point depressors such as those marketed under the trade name "Santapour" can also be used.

The alkyl chlorinated long chain fatty acid ester employed in the composition of the present invention can be a $C_{1-4}$ alkyl ester of a chlorinated long chain fatty acid of at least 12 carbon atoms, such as methyl chloropalmitate, butyl chlorotallowate, ethyl dichlorostearate, methyl dichlorostearate, propyl chlorolaurate, butyl dichlorooleate, methyl chloro-oleate and the like. The methyl dichlorostearate is preferred.

The silicone polymer foam inhibitor can be any of the well known liquid silicone polymers commercially available as anti-foam agents, such as dimethyl silicone polymer, diethyl silicone polymer, methyl alkyl silicone polymer, diphenyl silicone polymer, phenyl ethyl silicone polymer methyl phenyl silicone polymer and other dihydrocarbon silicone polymers such as disclosed in U.S. Patent No. 2,375,007.

It has been found that because of its effect on the rubber elements present in the tractor transmission and associated hydraulic power systems, the nature of the lubricating oil vehicle is important. In order to obtain the necessary rubber "tolerance," i.e. optimum swelling and minimum hardening, a blend of a hydrofined petroleum lubricating oil and a solvent extracted petroleum lubricating oil is used. Accordingly, a suitable oil vehicle for the composition of the present invention is an oil mixture consisting essentially of about 10–30 vol. percent of a hydrofined petroleum oil having a Saybolt universal viscosity at 100° F. of about 190–240 seconds, and about 70–90 vol. percent of a solvent extracted petroleum oil having a Saybolt universal viscosity at 100° F. of about 150–190 seconds. The viscosity of the mixed base oil vehicle is preferably about 180–220 SSU at 100° F., although the viscosity of the oil may be varied according to the service of the transmission and associated hydraulic systems. Additionally, the aniline point of the base oil should be such that the aniline point of the compounded fluid is about 195–210° F. The hydrofining of petroleum lubricating oils is well known to the art. The solvent extracted oil may be one obtained by any of the well known solvent extraction processes using solvents such as phenol, furfural, methylethyl ketone, $SO_2$, and solvent mixtures.

The color of the transmission fluid may or may not be modified by the addition of the suitably known oil-soluble dyes. It is usual to impart a characteristic color to combination hydraulic and transmission fluids to avoid misuse thereof as a crankcase lubricating oil.

A typical combination hydraulic and transmission fluid formulation which meets the required performance is the following:

| | Volume percent |
|---|---|
| Tricresyl phosphate | 3.1 |
| Neutral preferentially oil-soluble calcium mahogany sulfonate | 9.0 |
| Methacrylate ester polymer ("Acryloid 615") | 1.0 |
| Di-(tert butyl)-p-cresol ("Paranox 441") | 1.0 |
| Wax alkylated naphthalene "Pourex" | 2.0 |
| Methyl dichlorostearate | 0.3 |
| Silicone polymer foam inhibitor, p.p.m. | 10.0 |
| Dye | 0.1 |
| Hydrofined petroleum lubricating oil having a viscosity at 100° F. of about 210 SSU | 20.0 |
| Solvent extracted S.A.E. 10 grade petroleum lubricating oil having a viscosity at 100° F. of about 170 SSU | 63.5 |

One of the most rigid tests for combination hydraulic and transmission fluids are those required by International Harvester Specification B–6 for "Combination Hydraulic and Transmission Fluid." The above specific formulation was subjected to various tests required by this specification with the following results:

| Test | Formulation | B-6 Specification |
|---|---|---|
| Gravity, A.P.I. | 25.6 | |
| Aniline Point, °F | 200 | 195-210. |
| Flash, °F | 400 | 385 minimum. |
| Pour, °F | 0/35 | 0/35 maximum. |
| Viscosity at 100° F. SUS | 215.5 | |
| Viscosity at 210° F. SUS | 48.6 | 47 minimum. |
| Viscosity at 0° F. (extrapolated) SUS | 11,000 | 12,000 maximum. |
| Viscosity Index | 112 | 90 minimum. |
| Rust Test, IH BT-9* | Pass 100 hrs | 50 hr. minimum. |
| Oxidation, IH BT-10* | Pass | Pass. |
| Water Tolerance, IH BT-7* | do | 0.5 ml. maximum. |
| Rubber Seals: | | |
|   Elastomer aging, IH BT-6* | do | 0 to +8% swell. |
|   Volumetric change, IH BT-8* | do | 0% shrink. |
| Clutch Test, IH BT-22, 10,000 Cycles* | do | Pass. |
| Load Carrying ability, IH BT-20* | do | Pass Load of 326,000 p.s.i. |
| Hydraulic Performance, IH BT-21* | do | Pass. |

* Refers to International Harvester test specifications.

The foregoing data demonstrate the effectiveness of the hereindescribed combination hydraulic and transmission fluid, and illustrate the importance of the components, both in kind and concentration, since they must be carefully selected and balanced to attain all of the properties needed for such fluids.

The ability of a fluid to tolerate water without adversely affecting its detergency, anti-rust, oxidation stability, and other performance properties is essential. These fluids are used in systems which are open to the atmosphere. Consequently, they become contaminated with water of condensation in amounts as high as 2%. It is essential that no water-in-oil emulsions be formed in the fluid, and that the water not be visible to the eye. Also, the water contaminated fluid must still provide adequate rust protection to the metal parts that it comes in contact with. It has been found that only the neutral calcium sulfonates, especially the neutral calcium mahogany sulfonates, are effective additives for providing the requisite water carrying (water tolerance), anti-rust, detergency, and oxidation stability properties in the compounded fluid.

Each of the recited ingredients of the fluids described herein is essential for the formation of a satisfactory fluid that will function as a combination transmission (gear and clutch) lubricant and hydraulic fluid.

While particular embodiments of the invention have been described, it is to be understood that the invention is not limited thereto, but covers such modifications and variations as come within the spirit and scope of the appended claims.

We claim:
1. A combination hydraulic and transmission fluid consisting essentially of:
   (a) about 3–5 vol. percent of tricresyl phosphate;
   (b) about 7–12 vol. percent of an oil-soluble neutral calcium sulfonate;
   (c) about 0.5–2 vol. percent of a poly ($C_{4-20}$ alkyl) methacrylate viscosity index improver having a molecular weight of about 10,000–30,000;
   (d) about 0.5–2 vol. percent of a hindered phenol having at least one alkyl substituent ortho to a phenolic hydroxyl group;
   (e) about 0.5–2 vol. percent of a paraffin wax alkylated naphthalene lubricating oil pour point depressor;
   (f) about 0.1–0.5 vol. percent of a $C_{1-4}$ alkyl ester of a chlorinated $C_{12-18}$ fatty acid;
   (g) about 5–20 parts per million of a silicone polymer anti-foam agent; and
   (h) the remainder a mixture of about 10–30 vol. percent hydrofined petroleum lubricating oil having a viscosity of about 190–240 SSU at 100° F. and about 70–90 vol. percent solvent extracted petroleum lubricating oil having a viscosity of about 150–190 SSU at 100° F., said mixture having an aniline point of about 195–210° F.;

said fluid having a minimum viscosity of about 47 SSU at 210° F. and a maximum viscosity (extrapolated) at 0° F. of about 12,000 SSU, and an aniline point of about 195–210° F.

2. The fluid of claim 1 wherein
   (a) is 3.1 vol. percent;
   (b) is 9.0 vol. percent;
   (c) is 1.0 vol. percent;
   (d) is 1.0 vol. percent di-(tert. butyl)-p-cresol;
   (e) is 2.0 vol. percent;
   (f) is 0.3 vol. percent methyl dichlorostearate;
   (g) is 10 p.p.m.; and
   (h) is 83.5 vol. percent of a mixture of 24 vol. percent hydrofined petroleum lubricating oil having a viscosity about 210 SSU at 100° F. and 76 vol. percent solvent extracted petroleum lubricating oil having a viscosity of about 170 SSU at 100° F., said mixture having an aniline point of about 200° F.;

said fluid including 0.1 vol. percent oil-soluble dye, having a viscosity of about 48 SSU at 210° F. and a viscosity (extrapolated) at 0° F. of about 11,000 SSU, and an aniline point of about 200° F.

References Cited

UNITED STATES PATENTS

| | | | |
|---|---|---|---|
| 2,375,007 | 5/1945 | Larsen et al. | 252—318 |
| 2,636,861 | 4/1953 | Watson | 252—78 |
| 2,761,845 | 9/1956 | Rogers et al. | 252—33 |
| 2,954,344 | 9/1960 | Miller | 252—33.4 |
| 2,957,022 | 10/1960 | Cohen | 260—468 |
| 2,959,552 | 11/1960 | Peras | 260—408 |
| 2,960,468 | 11/1960 | Foehr et al. | 252—32.7 |
| 3,169,923 | 2/1965 | Guarnaccio et al. | 252—75 X |

LEON D. ROSDOL, *Primary Examiner.*

S. D. SCHWARTZ, *Assistant Examiner.*

UNITED STATES PATENT OFFICE
CERTIFICATE OF CORRECTION

Patent No. 3,396,114                                August 6, 1968

Paul C. Vienna et al.

It is certified that error appears in the above identified patent and that said Letters Patent are hereby corrected as shown below:

Column 2, line 58, "sulfide sulfonic acids, cetoxy caprylbenzene sulfoni acids," should read -- sulfonic acids, dicapryl nitro-naphthalene sulfonic acids; --. Column 3, line 8, "an" should read -- can --; line 9, "sulfonic" should read -- sulfuric --.

Signed and sealed this 23rd day of December 1969.

(SEAL)
Attest:

Edward M. Fletcher, Jr.                         WILLIAM E. SCHUYLER, JR.
Attesting Officer                                    Commissioner of Patents